June 20, 1939.   S. L. CLOTHIER ET AL   2,163,544
FILM SCANNING APPARATUS AND METHOD
Filed July 17, 1937
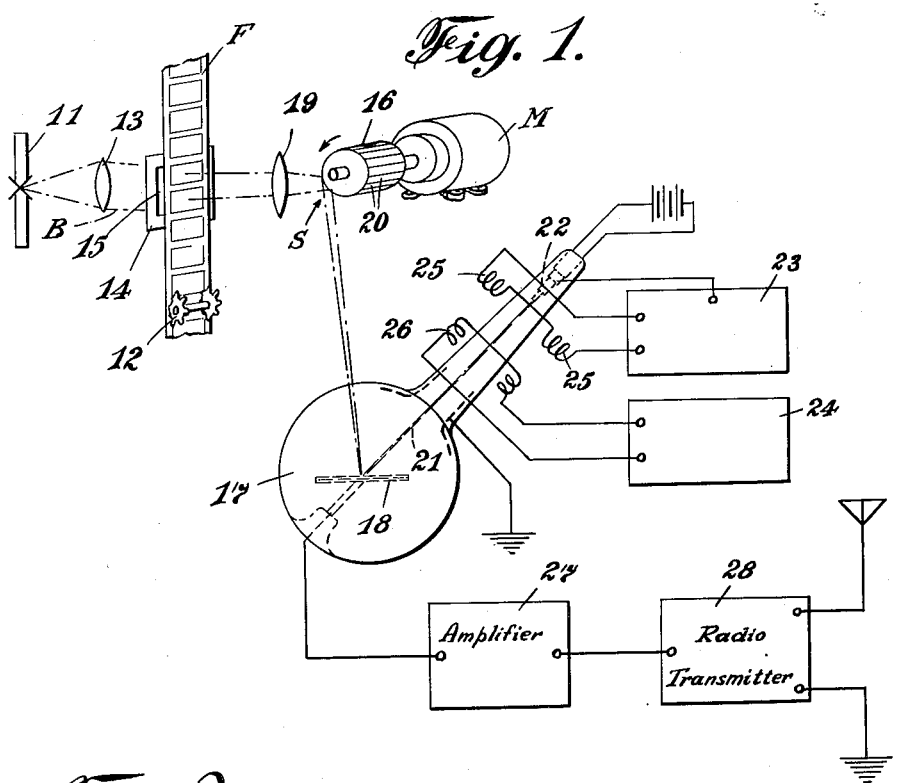
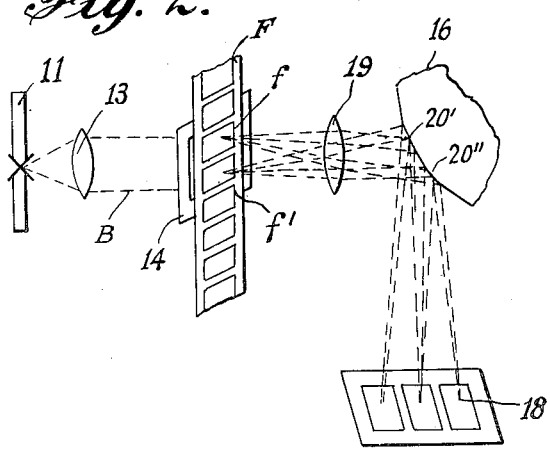
INVENTORS
Stewart L. Clothier
Harold C. Hogencamp Patented June 20, 1939

2,163,544

UNITED STATES PATENT OFFICE 2,163,544

FILM SCANNING APPARATUS AND METHOD

Stewart L. Clothier, Irvington, and Harold C. Hogencamp, Maplewood, N. J., assignors to Kolorama Laboratories, Inc., Newark, N. J., a corporation of New Jersey Application July 17, 1937, Serial No. 154,217

5 Claims. (Cl. 178—7.2)

This invention relates to a method of transmitting television signals and more particularly to a method of scanning motion picture film with the aid of a cathode ray transmitting tube.

Most motion picture films are intended for projection at a standard rate in order to faithfully reproduce the animation as well as the accompanying sound effects which are usually imposed on the sound track along one edge of the film strip. Ordinarily, standard film is projected at a rate of twenty-four frames per second. Television scanning systems are preferably operated at thirty or sixty frames per second so that standard sixty-cyle current from the power lines may be employed in obtaining synchronization. Thirty-cycle scanning of motion picture film projected at twenty-four frames per second introduces difficulties by virtue of the different operating speeds. This difficulty is sometimes overcome by rescanning certain frames of the film or certain portions thereof in order to increase the effective operating rate from twenty-four to either thirty or sixty frames per second. This arrangement involves the use of complicated and expensive apparatus which requires delicate adjustment and manipulation. For example, one method proposed for scanning such film comprises projecting the film at the standard rate of twenty-four frames per second and scanning alternate frames twice and the remaining frames three times, producing an effective scanning rate of sixty frames per second. In such a case the image for scanning purpose is flashed intermittently during but a small fraction of the time that the film is standing still and the light efficiency is necessarily low. Furthermore, the necessary intermittent motion imparted to the film subjects the film to excessive wear and a consequent shortening of its useful life.

According to the present method the motion picture film may travel at a constant rate equivalent to twenty-four frames per second and the associated cathode ray translating device may be operated at any desired frame frequency, for example thirty or sixty frames per second, or any intermediate number. The image produced on the cathode ray surface is not intermittent but continuous, resulting in high efficiency of the illuminating system. Accordingly, the light energy introduced to the cathode ray translating device is sufficiently great that an extremely high number of lines may be scanned per second while maintaining the signal output of the tube well above its noise level.

The principal objects of the present invention are: to provide an improved television scanning system; to provide a system of scanning motion picture film wherein the image is formed continuously upon the sensitive surface of the cathode ray translating device; to provide a method whereby the film employed may be moved at a continuous rate during the scanning operation; and to provide an improved method of scanning motion picture film at any desired rate above or below the normal film projection rate. These and other objects will become readily apparent from the following description in conjunction with the appended drawing, wherein:

Fig. 1 is a schematic arrangement of one type of apparatus which may be employed for practicing the invention; and Fig. 2 is a diagrammatic view of the optical arrangement of the present invention.

Referring again to the drawing, the arrangement consists of a suitable high intensity light source 11 such as an electric arc or an incandescent filament. Spaced from the light source 11 is a set of sprockets 12 capable of moving a motion picture film F continuously and uniformly at its standard projection rate. A condensing lens 13 is situated intermediate the source 11 and the film F and operates to concentrate the light emanating from the source into a beam B, the effective section of which may be limited by means of a mask 14 positioned closely adjacent to the film F. The mask 14 is provided with an aperture or opening 15 preferably dimensioned so as to permit the passage of the beam B through at least two adjoining frames of the film F. A reflecting frame-scanning drum 16 is movably mounted on the side of the film F opposite the source 11. The drum 16 is preferably provided with a plurality of plane surfaces 20 concentrically disposed about its outer periphery, which surfaces are capable of reflecting the beam B. Means such as a motor M is provided for rotating the drum 16 at a rate synchronized with the film, and in a direction corresponding with the motion of the film. For example, assuming that the film is moving downwardly at the rate of twenty-four frames per second and that the drum 16 is provided with twelve reflecting surfaces, the drum is rotated in the direction indicated by the arrow at the rate of two revolutions per second.

A cathode ray tube 17, operated in the usual manner for developing picture signals, and provided with a conventional photo-sensitive mosaic screen or surface 18 is positioned with respect to the drum 16 so that when a projection lens 19 is interposed in the path of the beam B on the side of the film opposite the light source 11, an image of the film is formed upon the photo-sensitive surface 18. The lens 19 and the drum 16 should be so positioned with respect to the surface 18 and the film F that the images of the two adjoining frames exposed within the aperture 15 are superimposed upon the surface 18 after the beam B is reflected from two adjacent reflecting surfaces 20 on the drum 16. This is more clearly shown in Fig. 2 of the drawing. With a mask of the type shown, two images of each frame $f$ and $f'$ are formed after the beam is reflected from two successive surfaces 20' and 20" as diagrammatically shown in Fig. 2, so that four images in all are formed at the plane of the surface of the screen 18. By properly spacing the prism 16 from the film F, and by suitably adjusting the lens 19, one image of the frame $f$, and one image of frame $f'$ may be brought into such close proximity that they are superimposed in coincident relation. The extra images may be masked out or disregarded and only the superimposed images are scanned. An appreciable gain in illumination is thus obtained and the distortion produced by the slight difference between the two superimposed images of adjoining frames is unnoticeable. As the film F and drum 16 move in synchronism the motion picture image is reproduced upon the sensitive surface 18. The film operates at a continuous uniform rate and since no shutter is employed, the image is at no time blocked from the screen. Of course the drum 16 must be so positioned and the rate of movement so adjusted that the motion of the image of each successive frame, formed on the surface 18, is effectively arrested.

The screen 18 serves as a target for a ray of electrons 21 emitted by the electron gun 22. The ray 21 is deflected along horizontal and vertical axes so as to successively cover every portion of the useful area of the screen or surface 18 in response to the impulses produced by the respective signal generators 23 and 24, which impulses are caused to pass through the respective sweep-control coils 25 and 26. Assuming that sixty images are to be scanned each second with 240 lines per frame, the generator 23 is arranged to produce 14,400 cycles per second, while the generator 24 produces 60 cycles per second. The responses from the photo-sensitive surface 18 are conveyed in the usual manner to an amplifier 27 after which they are conducted to a suitable transmission line or radio transmitter 28.

Other modifications of the present arrangement will suggest themselves to one skilled in the art and it is to be understood that the invention is not to be construed in a limiting sense as we contemplate any arrangement properly within the scope of the appended claims.

We claim:

1. Apparatus for scanning continuously moving motion picture film comprising means for forming stationary and coincidently superimposed images of at least two succeeding frames of the film to be scanned upon the photo-sensitive mosaic screen of a cathode ray translating tube, and means for periodically sweeping an electron ray over successive areas of said screen.

2. Apparatus as claimed in claim 1 including means for illuminating an area of at least 2 frames of the film to be scanned.

3. Apparatus as claimed in claim 1 wherein the electron ray is periodically swept over said screen at a frame frequency differing from the frame frequency at which the film is moved.

4. Motion picture projection apparatus for television including means for moving the film at a continuous rate of speed, means for forming stationary images simultaneously of at least two adjoining frames of the film in coincidently superimposed relation upon the photosensitive mosaic screen of a cathode ray transmitting tube, and means for developing picture signals from said images.

5. Apparatus as claimed in claim 4 wherein the means for forming stationary and coincidently superimposed images includes a rotatable prism bounded by plane mirrored surfaces, and means for rotating said prism in synchronism with the rate of film movement.

STEWART L. CLOTHIER.
HAROLD J. HOGENCAMP.